United States Patent [19]

Conner

[11] 3,837,872

[45] Sept. 24, 1974

[54] METHOD OF MAKING WASTES NON-POLLUTING AND DISPOSABLE

[75] Inventor: Jesse R. Conner, Pittsburgh, Pa.

[73] Assignee: Chemfix Inc.,, Pittsburgh, Pa.

[22] Filed: Jan. 4, 1972

[21] Appl. No.: 215,421

Related U.S. Application Data

[63] Continuation-in-part of Ser. No. 1,554, Jan. 8, 1970, abandoned.

[52] U.S. Cl............ 106/74, 106/76, 106/77, 106/78, 106/79, 106/80, 106/81, 106/84
[51] Int. Cl............ C04b 31/00
[58] Field of Search ............ 106/74–84

[56] References Cited
UNITED STATES PATENTS

| | | | |
|---|---|---|---|
| 1,436,061 | 11/1922 | Stryker et al. | 106/76 |
| 1,456,303 | 5/1923 | Ekstrom | 106/84 |
| 1,463,123 | 7/1923 | McAllister | 106/76 |
| 1,470,674 | 10/1923 | Amies | 106/84 |
| 1,757,470 | 5/1930 | Peebles | 106/84 |
| 2,016,796 | 10/1935 | Brock et al. | 106/84 |
| 2,809,118 | 10/1957 | Keil | 106/84 |

*Primary Examiner*—James E. Poer
*Attorney, Agent, or Firm*—Brown, Murray, Flick & Peckham

[57] ABSTRACT

An aqueous solution of an alkali metal silicate is mixed with waste material and a silicate setting agent to cause the silicate and setting agent to react with each other. The proportions of the silicate and setting agent are such that the reaction converts the mixture into a consolidated chemically and physically stable solid product that is substantially insoluble in water and in which pollutants are entrapped in the solidified silicate so that the waste material is rendered non-polluting and fit for ultimate disposal.

3 Claims, No Drawings

METHOD OF MAKING WASTES NON-POLLUTING AND DISPOSABLE

This application is a continuation-in-part of my co-pending patent application, Ser. No. 1,554, filed Jan. 8, 1970, now abandoned.

This invention relates to the ultimate disposal of wastes, which means the final disposition of wastes that, for either technical or economic reasons, cannot be recycled or further reduced in volume or weight by conventional treatment processes.

The term wastes includes, as typical examples, garbage and related domestic wastes, raw human waste, solid industrial wastes, packaging materials, plastics, glass and metal containers, sludges of various types and sources, slags and other materials occurring as wastes in the metallurgical or mining industries, chemical process by-products not economically utilizable and oily materials.

Land of little value, as that term is used herein, means land unfit or of no practical value for commercial purposes, agriculture, residential or recreational uses and related purposes, examples being abandoned foundations and other excavations, exhausted strip mine areas, marshland and other soil areas of like nature of so little value as not to justify the cost of reclamation.

At the present time two major and growing problems require solutions environmental in nature. One of those problems is the every-increasing amount of wastes of all kinds. Moreover, nearly all pollution control processes result in the production of solids, sludges or liquids with a higher concentration of pollutants than originally existed in the waste stream. This involves the matter of disposal. Some wastes are the result of other waste treatment processes, and some are unwanted or nonrecycled process by-products. The other problem arises from the increase in population, with increased need for land areas suited to all types of uses; this problem involves reclamation or improvement of land of little value.

Packaging materials, garbage, and other combustible matter are disposed of in part at the present time by incineration but this in itself involves problems such as the evolution of air pollutants, including toxic substances, from the incinerators, the cost of moving the wastes to the incinerators, emission of objectionable odors, and the disposal of the incinerator residues.

Further aggrevation of the situation, with potential increase in the quantities of solid wastes to be disposed of, arises from the burgeoning growth of such disposable items as womens wear, aprons, towels and, particularly, hospital items including gowns, disposable bedding, and disposable items used for mass feeding in institutions, and the like.

Non-combustible wastes, such as glass and metal containers, and non-biodegradable plastics are obviously more difficult to dispose of than are combustible wastes.

As for human wastes, for many years it was accepted practice for municipalities to dispose of them by flushing or dumping into streams of bodies of water with reliance upon the dissolved oxygen content of the water to effect biological purification. As recently as 1945 this was the method still in use by many cities. With the development of the concepts of environmental control there was increasing public condemnation of such pollution of streams and lakes which resulted in the development of methods, such as the activated sludge process, of treating municipal sewage that are less subject to objection.

Nevertheless, particular problems in the disposal of raw human wastes have been created on an increasing scale by the rise in outdoor recreation, such as camping and boating. The handling of sanitary wastes on camp sites or other places where people play outdoors was for many years accomplished by the use of privies built over pits or trenches which were periodically limed or otherwise disinfected, and covered with soil when full. On boats human waste was generally dumped directly into the water. The present and growing interest in avoiding pollution of land and water has rendered such disposal methods unacceptable for many areas. In fact, they are illegal in many states with the result that camping with only the most rudimentary practices or equipment has been severely curtailed by law. For instance, the Pennsylvania Department of Health will not permit even individual slit-trench sanitary methods.

The problem of disposal of raw human wastes has been magnified by the steady increase in the use of state and national parks as well as by the growth of large public or commercial camp sites, trailer parks and like, as well as by portable toilet facilities provided at construction sites and the growth of marinas where municipal facilities or septic tanks are not available. The problem is present also in aero-space life support systems as well as in connection with underwater craft such as submarines and oceanography exploration.

Considering only the outdoor recreation situation, there are a number of factors to be considered. For instance, there is the primitive camper who must have fairly light and readily portable equipment which may take the form of a compact folding toilet which receives the human wastes in plastic bags which are eventually buried. On a larger scale are small, portable holding tank toilets which are usually charged with a certain amount of water and, possibly, disinfectant, and which function simply as a holding tank which is emptied periodically at some point, which may be governed by local law. Construction site toilets and those used in camping trailers may be of the latter sort. To be considered also are the large multi-unit camp grounds provided with central toilet facilities that require either connection to an available municipal sewage disposal system or a septic tank installation, which later requires periodic pumping out and disposal of the accumulated waste.

Such wastes as garbage, metallurgical slag, glass and metal containers, and other municipal and industrial solid wastes have been used for many years as landfills. To some extent this disposition of such solid wastes has been successful but it has likewise resulted in secondary pollution and health problems, and land so reclaimed may not in any event be suitable for certain purposes, such as building construction, because of the unstable nature of the filled land. That is, some types of solid wastes are physically or chemically unstable. Thus, garbage decomposes under the influence of natural factors, with release of objectionable odors, toxic or biologically harmful products which enter into the contiguous water table and make their way into nearby streams, thus creating a water pollution problem.

Moreover, experience has shown that even with the best so-called sanitary landfills there can also result insect, rodent and disease problems, and even air pollution in the form of odors or smoke from refuse fires. Inevitable decomposition of non-permanent materials results in reduction of the volume of the material used as landfill with resultant subsidence of the filled land. Subsidence can also occur when metals are gradually corroded with volume reduction, and this is exaggerated in the case of large hollow objects such as automobile bodies, metal cans and drums. The burning of worn out automobile tires creates large volumes of objectionable, sooty smoke, and even if such tires are buried there may be a tendency for them to rise to the surface of the filled land after a period of time. Moreover, even if the subsidence referred to does not occur, land so filled may be insufficiently compacted or stable to support various types of structures.

The stability problem can be countered, in part, by subdivision of the waste and compaction at the land filled site but the other objectionable factors remain.

From what has been said herein it will be realized that the preponderance of the wastes alluded to, such as packaging materials, plastics, garbage, raw human waste, metal containers, and the like are not in a chemically fixed state.

It is among the objects of this invention to provide a method of treating wastes which makes them suitable for ultimate disposal, which does not add appreciably to the volume of the wastes, which operates at atmospheric pressure and ambient temperature, which does not produce a liquid discharge, which is simple and economical and environmentally acceptable, and which renders the wastes non-polluting, substantially insoluble in water, solid, and chemically and physically stable.

A further object is to provide such a method that produces a product which is especially suitable and safe for land improvement, such as landfill for both subterranean and surface use, to reclaim land of little value or to change its contours.

A special object is to provide a method of treating raw human wastes which is applicable to recreational land sites of all types and sizes where municipal sewage treatment facilities are not available, as well as to boats, marinas, underwater vessels, aero-space support systems and the like.

In accordance with this invention, commercial or domestic wastes are mixed with an alkali metal silicate which, in the presence of a silicate setting agent, causes the mixture to undergo consolidation and solidification. Although any alkali metal silicate could be used, cost and availability are major factors to be considered. For example, potassium silicate and lithium silicate are suitable, but that they are too expensive to be practical and are often difficult to obtain. On the other hand, sodium silicate is ideal because it is the least expensive and is generally available throughout this country in either liquid or solid form. The liquid silicate is available in a variety of ratios of $Na_2O$ to $SiO_2$.

The sodium silicate will ordinarily be used in its commercial liquid form but if for any reason it is desired to use solid silicate, water may be added to the mixture in the form of a solution of a setting agent or simply as water, the criterion in any event being to supply the mixture of waste, silicate and setting agent at a consistency which may be poured or pumped into molds to make shapes for various purposes, or it may be pumped onto the surface of land of little use, such as worked out strip mine areas, or to fill cavities such as mine excavations, or to fill and enclose auto bodies, tires and other bulky objects disposed on land to be reclaimed, or even to cover solid waste that has already been dumped on land. Landfill material made by the process described herein is substantially volume stable, inert, chemically irreversible, substantially insoluble in ground water, and does not contaminate the atmosphere or the contiguous land and ground water. Even though, over a long period of time, there may be some leaching of the landfill, it is so small and so slow that it is non-polluting.

Solid wastes as well as liquid and semi-liquid wastes, such as sludges and slurries, are suited to the practice of the invention. In the case of solid wastes, they are chopped, shredded, crushed or otherwise subdivided and, as thus prepared, the material, whether a single-waste type or a mixture of types, is mixed with sodium silicate. If the subdivided waste does not naturally contain a silicate setting agent, or if such an agent is present but in an amount insufficient to effect the desired consolidation, a setting agent may be added to the mixture of waste and silicate.

The proportions in which the waste, sodium silicate and silicate setting agent are present in the mixture will depend in large part upon the composition of the waste, the speed of reaction required and the desired physical character of the consolidated product. Reaction between the silicate and the setting agent will result in setting and consolidation of the mixture. Depending upon the composition of the mixture and the use to which the consolidated product is to be put, the resultant product may vary in coherency from a friable clay-like to stiff clay-like to rock hard product, but it is a chemically and mechanically stable solid.

A variety of setting agents are applicable to the practice of the invention. In general, acids or acidic materials act promptly to cause gelation, or setting of the silicate. If the setting agent is to be added to the mixture, it should be a polyvalent metal compound; that is, compositions containing polyvalent metal ions. It has been found that setting agents which are only slightly soluble or compositions containing only small amounts of soluble setting agents are most desirable for commercial use with this process. Such setting agents are typified by such compounds as Portland cement, lime, gypsum and calcium carbonate, which are the cheapest and most available, although aluminum, iron, magnesium, nickel, chromium, manganese or copper compounds could be used, but they are more expensive and difficult to obtain. An objection to calcium chloride is that it may react more rapidly than desired because of its high solubility so that the reaction cannot be controlled. On the other hand, Portland cement, lime, and gypsum have a quick gel forming reaction, which is highly desirable, and then continue with a hardening reaction over a period of time. The properties of Portland cement as a setting agent are excellent and it is economical and readily available in large quantities at low prices throughout the U.S. Also, the reaction rate with the silicate is easily controllable.

The interactions between the waste and the chemicals become extremely complex because many different reactions occur simultaneously, especially with wastes containing a variety of reactive pollutants. However, three classes of interactions can be identified.

A. Reactions between sodium silicate and the waste being treated. Sodium silicate reacts with all polyvalent metal ions, with acids, with certain other cations and anions and with a number of organics. These interactions result in the neutralization of acids and in the almost complete insolublization of almost all polyvalent metal ions. This latter ability of sodium silicate is one of its prime virtues, since the largest group of toxic pollutants from industrial wastes are metal ions. The insoluble compounds produced are non-toxic and cannot be resolublized later on.

B. The silicate reacts with certain reactive components of the setting agent. For example, it reacts with the calcium ion of Portland cement, lime, gypsum and calcium chloride. In the case of other setting agents it would react with other metal ions or with acidic components. When this reaction occurs slowly, as it does with these slightly soluble classes of setting agents, the resultant reaction product is a gel structure which has a number of very important properties. The gel acts as a sort of sponge holding within itself very large quantities of water and non-reactive materials of other sorts. These gels have the unique property of being able to hold very large quantities of water while acting in all respects like a solid. The gel reaction can occur quickly enough, for example, in seconds or minutes, to prevent the settling out of solids which one wants to contain in the structure. Because of their properties they also hold ions in place by various chemical and physical bonding mechanisms and thereby act much as an ion exchange resin. Other waste components such as oils are also entrapped in the structure and thereby immobilized. This gel forming capacity is an important reaction in the process described herein, especially for those waste components which do not react directly with the sodium silicate, and it also provides the desirable physical properties of the final solidified waste.

C. In the case of setting agents such as Portland cement, the setting agent itself also undergoes a series of reactions with water, starting with hydrolysis and continuing through hydration and other interactions. This provides a continuing hardening effect whereby the physical properties of the waste actually improve with age over a period of days or weeks. It is also believed that during this hardening period further reactions occur between the setting agent and the silicate and in some cases between all three components: the setting agent, the silicate, and the waste.

The final solid material form is really a pseudo-mineral containing various entrapped waste components such as water, oils and other organics, and a variety of inorganic ions and compounds. Its physical properties can range from that of soft dirt to a hard, shale-like material.

The above desirable conditions are obtained with relatively small amounts of silicate and setting agents. In general the volume added to the waste by the treatment chemicals is less than 10 percent and often below 5 percent by volume. This is a very important consideration, not only because of cost, but also because in creating landfill from wastes, it is usually desirable to keep the volume to a minimum. In contrast, if it were necessary to use cement alone to solidify wastes, a volume increase of about 100 percent would be necessary to obtain a solid which contained all the liquid portion of the waste within its structure. This is so because cement does not yield the same gel structures which are formed by the soluble alkali metal silicates. The typical concrete composition is 1 part cement, 2.75 parts sand and 0.5 part water by weight; on a volume basis this is about 1 part cement to 1 part of water. By comparison the subject invention rarely uses more than 1 part of cement and 0.5 part of silicate to 10 parts of water (liquid wastes). Therefore, the silicate system involves very little bulk increase compared with use of cement alone.

Aside from the volume increase and cost, no cement mixture can produce the same results as the cement-silicate mixture. Such large quantities of cement are required that the final product is rock hard and is usually unsuitable for efficient landfill use, since it cannot be handled with earth moving equipment. Although the present invention can also produce such rock hard materials, this is generally not desirable. Similarly the cement system does not react in the same way, or in many cases at all, with such pollutants as the toxic polyvalent metals to produce insoluble compounds. Therefore, leaching of a cement composition produces large quantities of dissolved polyvalent metals. In the silicate system these metals are rendered almost totally insoluble.

Another factor of importance is gel time. For practical applications it is often desirable to have initial gelation occur within minutes so that the waste will not flow uncontrollably. This is also important if the waste is to be hardened under water or used to create an above surface landfill. Normal cement compositions are not capable of producing such gels in so short a time unless the composition is made so stiff that it is not pumpable. For practical applications it is important that the solidification chemicals be mixed with the waste in a mixer and then pumped, sometimes many hundreds of feet, to the disposal area with minimum pumping energy and pipe size. This requires good fluid characteristics of the waste, which is achieved with the silicate system.

The application of the practice of the invention to the disposition of household refuse may be illustrated by the following example in which there was treated a household refuse that included animal and vegetable food wastes, paper, plastics, glass, metal and other household wastes combined in the proportions in which they were generated in an actual household. In this example the sodium silicate used was Philadelphia Quartz Grades "N" characterized by an $SiO_2:Na_2O$ ratio of 3.2:1 and a solids content of about 38 percent.

EXAMPLE 1

Household refuse as described above was mixed with sufficient 30 percent calcium chloride solution to make a stiff slurry. A quantity of the sodium silicate solution equal to the volume of calcium chloride solution was then added quickly and the mixture shaken. Solidification occurred almost instantaneously to a point where the mixture would not flow and resisted penetration by any blunt object to about the same degree as a hard soil or clay. It was observed that some fluid was entrapped in pockets in the material due to the rapid gelling. This mixture was kept in a closed glass bottle for a period of one month. During this time no gas evolution occurred, as evidenced by the lack of pressure built up inside the bottle; while the mixture exhibited an unpleasant odor when the jar was opened there was no evidence of the extensive putrifaction which would normally be expected to occur in such a mixture. The glass jar was broken away from the mixture and it was allowed to dry in the air for 2 months. During drying there was some shrinkage and the material crumbled somewhat to resemble a well dried out soil or clay. It still had considerable cohesive strength and very little compressibility and it was observed that this mixture either wet or dry would constitute a landfill material at least equal to usual soils in its load bearing ability and stability.

In addition to the properties described, it will be understood that the product might also be crushed and used as aggregate for other purposes.

Although the invention has been described largely with reference to the treatment of solid wastes, it is to be understood that it is applicable likewise to the treatment of liquid or semi-liquid wastes such, for example, as spent steel pickling liquors, and mine water sludges. These may need no additional setting agent because of their content of hydrochloric or sulphuric acid, as the case may be. As before, an aqueous solution of an alkali metal silicate, such as sodium silicate, is mixed with the waste material and a silicate setting agent, but in this instance the setting agent is already in the waste material, although additional setting agents may be added if it is felt that the wastes do not already contain enough.

Hard gelled products capable of bearing weight to support building structures are produced by this treatment. Such pickling liquors and sludges may be used also to supply silicate setting agents for a variety of other wastes such as packaging materials, plastics, and the like.

Illustrative of this aspect of the invention are the following examples.

EXAMPLE 2

A number of mixtures of acid mine sludge and sodium silicate were made. Such sludges contain, generally, hydroxides or hydrated oxides of iron and manganese, calcium sulfate, and other minor mineral constituents. The sludge was an actual concentrated sludge from acid mine water treatment and consisted of about 12 percent solids with a pH of 7. Mixtures were made containing acid mine sludge to sodium silicate ratios of 10 to 1, 4 to 1, 3 to 1, 2 to 1, 1 to 1, 1 to 2, 1 to 3, 1 to 4, 1 to 10. The first five mixtures all set to homogeneous gels with 30 seconds. The mechanical character of these gels was very soft, firm, very firm, hard, and hard, respectively. The fifth mixture (1 to 1 ratio) exhibited a small amount of clear excess liquid on the surface of the gel; the others resulted in no excess liquid. The last four mixtures containing larger amounts of sodium silicate solution all resulted in a slow gelling reaction yielding a nonhomogeneous precipitate and excess liquid on top of the precipitate. Duplicate samples of the first five mixtures were allowed to dry for three months. They all resulted in very hard residues with 10 percent to 25 percent shrinkage from the wet condition. Those residues with about 1 to 1 to 2 to 1 ratio of sludge to sodium silicate were rock hard, while the others were hard but more friable.

EXAMPLE 3

A sulfuric acid synthetic pickle liquor was prepared by subjecting Type 302 stainless steel scrap to 12 percent sulfuric acid at 180° until reaction ceased. Samples of the cooled liquor were mixed with sodium silicate solution in the ratios of 3 to 1, 2 to 1, 1 to 1, 1 to 2, and 1 to 3. The first three samples reacted almost instantaneously to give a hard precipitate while the last two required more than an hour for completion of the reaction. After completion, the 3 to 1 ratio sample contained about 80 percent liquid, which was a highly colored liquid indicating an excess of pickle liquor. The 2 to 1 ratio had about 50 percent highly colored liquid and the 1 to 1 ratio showed about 20 percent slightly colored liquid, indicating less excess of pickle liquor. The 1 to 1 ratio sample contained a clear supernatent liquid, about 10 percent of the total volume, with some suspended matter in it. The 1 to 3 ratio sample was the same as the 1 to 1 ratio sample, indicating an excess of sodium silicate. In the latter two samples the supernatent liquid was alkaline and contained very little metal ion in solution. A duplicate sample with the 1 to 2 ratio was allowed to dry in air, resulting in a hard friable residue of precipitated metal compounds and silicates.

EXAMPLE 4

About 2,000,000 gallons of sludge from the waste water treatment plant of a major steel mill was treated using this process. The waste had a total solids content ranging from 10 percent to 20 percent with relatively little dissolved solids. The solids consisted of metal hydroxides, river silt, sludge from a secondary sewage treatment plant and tramp oil. It had an unpleasant, oily, metallic smell, high viscosity, and a black appearance much like used motor oil. The sludge was homogenized by circulation in the storage lagoon and then was pumped through a mobile treatment unit at the rate of about 150 gallons per minute. Portland cement was first added with thorough mixing at the rate of 0.33 pounds per gallon of sludge, followed by the addition of 0.1 gallon of sodium silicate per gallon of sludge. This was done in a continuous mixer and the waste was subsequently pumped about 300 feet to the disposal area. Gelatin occurred within 15 minutes and the material hardened within 48 hours to a soft, clay-like consistency. The black color (primarily due to ferrous hydroxides and oil) changed as hardening occurred to a reddish-brown, clay-like appearance as ferrous iron was oxidized on exposure to the air. Encapsulation of the oil was so complete that no oily appearance or feel could be detected. A very slight odor remained which was detectable only by crumbling the material and smelling it closely. The final product was considered non-polluting in all respects and was handled by earth moving equipment to fill in gullies in the existing plant property. It was a satisfactory landfill.

EXAMPLE 5

Waste from the plant and sludge from the waste treatment plant of a large automotive assembly operation was treated with the same procedure as in Example 4, except that chemical additions were at the rate of 0.83 pounds of Portland cement per gallon of waste and 0.02 gallons of sodium silicate per gallon of waste. The waste here consisted of precipitated metal hydroxides of various types, paint sludge, sludge from phosphating and cleaning operations, tramp oil, and small quantities of various other miscellaneous plant wastes. Solids content was about 5 percent to 10 percent. This material was treated at the rate of up to 200 gallons per minute and produced a hard, friable light gray material with much the appearance of natural rock. It had no odor. This material was deliberately made harder than normal and some difficulty was experienced in breaking it up with earth moving equipment. It was judged that it would have made excellent landfill if cast into place without further handling. About 300,000 gallons of the material was treated. Several months later the job was repeated on the refilled lagoons with about 500,000 gallons of material. This time the additions of both cement and silicate were lower by about 10 percent, resulting in a softer, more easily handled, dirt-like material.

EXAMPLE 6

About 10,000 gallons of hot (150°F), acid, condenser cleaning solution were treated at a major power plant. The solution consisted of hydrochloric acid as well as foaming agents and inhibitors, and was partially neutralized with the sodium hydroxide used as the final condenser wash. Portland cement used was at the rate of 1.7 pounds per gallon of waste, and sodium silicate at the rate of 0.08 gallons per gallon of waste. Larger quantities of chemicals were required here because of the high free acid and free metal ion concentrations in the waste material. The product solidified satisfactorily and was left in place as a thin-layer landfill at the site. A similar job was done at another power plant where the boiler washing consisted of spent hydroxy-acetic and formic acid solutions containing oil and dissolved and suspended heavy metals. This was done at ambient temperatures near the freezing point, using approximately the same ratios of chemicals as with the previous power plant job, except that in this case the waste, while still liquid, was pumped under water. Three days later when the water was drained, the waste was found to have solidified into a very hard, clay-like material. The test was considered satisfactory.

The amounts of silicate and setting agent to be used in practicing the invention will depend in large part upon the water content of the raw waste, the grade of silicate, and upon the hardness desired in the final fixation product. Consequently, amounts applicable to all purposes cannot be stated but they are readily determinable in any given case.

For many purposes it is preferred that the setting agent be in the form of a dry solid (reactive with the silicate) added to the waste to be fixed, either before or after the addition of the silicate because this often provides a better fixed product than when setting is caused by a liquid. Harder and denser products are generally produced by mixing the waste with the setting agent before the addition of the silicate.

In treating raw human wastes it is desirable to incorporate in the composition a disinfecting agent and under some circumstances it may be preferred to include color or odor masking agents, either or both. It is to be understood that disinfectants includes germicides, bactericides and bacteriostatic agents. Among the many disinfectants available, typical ones are phenol, hexachlorophene, iodine and chlorine. Such proprietary materials as Lysol, De Germ antiseptic, Sani-Flush and Cidex also serve as deodorants.

In order to produce final waste products of as uniform character (e.g., density and solids distribution) as possible it is desirable also that the fecal matter be broken up before the setting action takes place. In many instances, e.g., camping equipment, it would not be feasible to achieve such dispersion by mechanical action but this can be accomplished by the addition to the waste of such materials as enzymes or surfactants. Typical dispersants are as follows:

1. Rinso or other commercial detergent products with or without bacterial control agents, enzymes, bleaches, etc.
2. Formula 409 Cleaner (contains a higher alcohol, such as butyl alcohol, in addition to detergents)
3. Potassium permanganate
4. Hydrogen peroxide
5. Sodium bicarbonate-acetic acid — (or any other gas forming combination to aid in dispersion)
6. Enzymes — to aid in dispersion and chemical digestion of fecal matter and toilet tissues The result of the treatment is a solidified or hardened mass that can be handled easily for disposal. Liquid content of the waste and treating agent or agents is entrapped so that there is no seepage from the solid body, which is substantially insoluble in water and consequently can be used safely as landfill or dropped into bodies of water to sink to the bottom. For landfill purposes it will usually be desirable to include in the composition a color masking or an odor masking agent, or both. And to meet all health standards the composition should contain a bactericide or disinfecting agent.

In the case of portable toilet equipment provided with disposal bags, the treating agents are added directly to the contents and after fixation the bags are disposed of appropriately.

The following examples are illustrative:

EXAMPLE 7

500 ml. of mixed urine and feces was combined together with shaking with 500 ml. of sodium silicate solution (Philadelphia Quartz Grade "N") and 100 ml. of 5.25 percent sodium hypochlorite solution. A frothing and bleaching reaction occurred between the hypochlorite and the feces, but after standing for two days complete dispersion was not obtained. 25 ml. of "LYSOL" was added, and after two more days no change had occurred except that the toilet paper was dispersed into fibers. At this time a mixture of 300 grams of Portland cement and 50 grams of "Monochem T5" deodorant was added to the mixture and the mixture agitated. In about two minutes gelation occurred with no excess water evident and this hardened within 24 hours to a concrete-like consistency. The only odor present was that of the "T5" deodorant, and the color was masked by the dye in the "T5." The solid was sectioned with a hacksaw and was found to be fairly uniform except for several areas corresponding to undispersed pieces of feces. These areas, however, had no different odor from the remainder of the material, which was hard and nondeformable. Samples were removed from both the hard areas and the soft areas and submitted to bacteriological analysis, which showed that total disinfection was accomplished as defined by standard test methods. Storage of this material for one month resulted in no change.

EXAMPLE 8

500 ml. of combined urine, feces, and toilet tissue was treated with a mixture of 50 ml. "Formula 409" detergent. The original fecal odor was immediately eliminated and replaced by a not unpleasant, organic odor. After one hour, the material was found to be completely dispersed, and no additional changes had occurred. At this time 200 ml., of sodium silicate solution, 200 grams of Portland cement and 5 grams of "T5" was added to the above, and the result shaken, whereupon gelation occurred in 30 seconds. The resulting solid was a firm, clay-like material which hardened to a very firm, hard material in 48 hours. The sample had a strong organic odor which did not identify its original source.

EXAMPLE 9

500 ml. of combined urine, feces, and toilet tissue was mixed with 150 ml. of "Cidex," and 20 grams of "Monochem X15" toilet deodorant. Some fecal odor was still observed at this point. After 30 minutes, 250 ml. of sodium silicate solution, 250 grams of Portland cement, and 5 grams of "T5" were added and the mixture shaken, whereupon solidification occurred within one minute, and was quite hard in 15 minutes. After 72 hours, the material was concrete-hard, and the odor was not offensive and did not give evidence of the original source.

The foregoing examples serve to illustrate my process and show how different types of waste materials, not only solid but also liquid, can be treated with this process to produce a stable material suitable for ultimate disposal; that is, it requires no further treatment. The material is useful for landfill and also for purposes such as road building and as aggregates for fillers for cements or coatings. A feature of the invention is that although the compositions contain water as used, the solidification phenomenon entraps the water within the cells of the gel so that it does not seep out into the soil, thus avoiding contamination of the adjacent ground water. Likewise the chemical fixation of biodegradable waste that is a feature of the invention avoids the development of objectionable degradation products, whether or not such products would form objectionable odors or be harmful to health.

The disposal of some wastes carrying microorganisms by the method of the invention might represent a health hazard through contact of the hardened surface with water but this possibility can be taken care of easily by incorporating in the mix an anti-bacterial material such as Dakin's solution or chloramine T.

Limits applicable to all systems cannot be stated as will be understood from the diverse nature of the wastes, some of which are reactive and some not reactive. Also, in addition to that, conditions varying in degrees of mechanical nature (i.e., rock hard to friable) may be required for different purposes (i.e., to fill depressed areas or to support building structures). In any case, proportions of wastes, sodium silicate and setting agent can be determined readily by cut-and-try procedure.

The invention combines disposal of wastes and reclamation or upgrading of land. Thus it contributes materially to the solution of environmental problems. It is not a process for consolidating or stiffening soil or sewage sludge to form a plastic mass that can be used for packing, but a method of preparing wastes for ultimate safe disposal. When the final product is used as landfill, it is added as a finished product to the soil and will not pollute it. Processes involving the stiffening of soils or sewage sludges by making them into plastic masses by the use of water glass and sodium bicarbonate, for example, are not the process described herein and are not suitable or acceptable for waste disposal. such processes cannot be substituted for my process to provide inert, insoluble, solid waste material that will not pollute the environment, because they do not produce a product that is chemically fixed and stable so that the pollutants are locked in.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A method of treating liquid and semi-liquid wastes to render them non-polluting and fit for ultimate disposal, comprising mixing an aqueous solution of an alkali metal silicate with liquid or semi-liquid waste and a silicate setting agent from the group consisting of Portland cement, lime, gypsum and calcium chloride to cause the silicate and setting agent to react with each other, the proportions of alkali metal silicate and setting agent being such that the reaction converts the mixture into a consolidated chemically and physically stable solid product substantially insoluble in water and with its pollutants entrapped in the solidified silicate.

2. A method according to claim 1, in which said setting agent is Portland cement.

3. A method according to claim 1, in which the amount of alkali metal silicate and setting agent forms less than about 10 percent by volume of the mixture.

* * * * *

REEXAMINATION CERTIFICATE (469th)

United States Patent [19]

Conner

[11] B1 3,837,872

[45] Certificate Issued Feb. 25, 1986

[54] METHOD OF MAKING WASTES NON-POLLUTING AND DISPOSABLE

[75] Inventor: Jesse R. Conner, Pittsburgh, Pa.

[73] Assignee: National Environmental Controls, Inc., Metarie, La.

Reexamination Request:
No. 90/000,668, Nov. 13, 1984

Reexamination Certificate for:
Patent No.: 3,837,872
Issued: Sep. 24, 1974
Appl. No.: 215,421
Filed: Jan. 4, 1972

Related U.S. Application Data

[63] Continuation-in-part of Ser. No. 1,554, Jan. 8, 1970, abandoned.

[51] Int. Cl.$^4$ ............................................. C04B 31/00
[52] U.S. Cl. ........................... 106/74; 106/76; 106/77; 106/78; 106/79; 106/80; 106/81; 106/84
[58] Field of Search ................................... 106/74–84

[56] References Cited
FOREIGN PATENT DOCUMENTS
1246848 10/1960 France

*Primary Examiner*—William R. Dixon, Jr.
*Assistant Examiner*—Steven Capella

[57] ABSTRACT

An aqueous solution of an alkali metal silicate is mixed with waste material and a silicate setting agent to cause the silicate and setting agent to react with each other. The proportions of the silicate and setting agent are such that the reaction converts the mixture into a consolidated chemically and physically stable solid product that is substantially insoluble in water and in which pollutants are entrapped in the solidified silicate so that the waste material is rendered non-polluting and fit for ultimate disposal.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are cancelled.

Claim 3 is determined to be patentable as amended.

New claims 4–43 are added and determined to be patentable.

3. [A method according to claim 1, in which] *A method of treating liquid and semi-liquid wastes to render them non-polluting and fit for ultimate disposal, comprising* mixing an aqueous solution of an alkali metal silicate with liquid or semi-liquid waste and a silicate setting agent from the group consisting of Portland cement, lime, gypsum, and calcium chloride to cause the silicate and setting agent to react with each other, the proportion of alkali metal silicate and setting agent being such that the reaction converts the mixture into a consolidated chemically and physically stable solid product substantially insoluble in water and with its pollutants entrapped in the solidified silicate, the amount of alkali metal silicate and setting agent [forms] *forming* less than about 10 percent by volume of the mixture.

4. *The method of claim 3 wherein the cement, silicate, and liquid waste are mixed in a ratio of about 1 part of cement to about 0.5 part of silicate to about 10 or more parts of liquid or semi-liquid waste by volume.*

5. *A method of treating liquid and semi-liquid wastes to render them non-polluting and fit for ultimate disposal, comprising mixing an aqueous solution of an alkali metal silicate with liquid or semi-liquid waste and a silicate setting agent from the group consisting of Portland cement, lime, gypsum and calcium chloride to cause the silicate and setting agent to react with each other, the proportions of alkali metal silicate and setting agent being such that the reaction converts the mixture into a consolidated chemically and physically stable product having a clay-like consistency, the product being substantially insoluble in water and with its pollutants entrapped in the solidified silicate.*

6. *The method according to claim 5 wherein the product is friable.*

7. *The method of claim 6 wherein the cement, silicate, and liquid waste are mixed in a ratio of about 1 part of cement to about 0.5 part of silicate to about 10 or more parts of liquid waste by volume.*

8. *The method of claim 7 wherein the wastes are organic.*

9. *The method of claim 7 further comprising the step of dispersing the treated liquid and semi-liquid waste as a product in a landfill after mixing with the aqueous solution of alkali metal silicate and the silicate setting agent.*

10. *A method of treating liquid and semi-liquid wastes containing polyvalent metal ions to render the waste non-polluting and fit for ultimate disposal, comprising mixing an aqueous solution of an alkali metal silicate with liquid or semi-liquid waste containing polyvalent metal ions and a silicate setting agent from the group consisting of Portland cement, lime, gypsum and calcium chloride to cause the silicate and setting agent to react with each other, the proportions of alkali metal silicate and setting agent being such that the reaction converts the mixture into a consolidated chemically and physically stable, clay-like, solid product substantially insoluble in water and with its pollutants entrapped in the solidified silicate.*

11. *The method of claim 10 wherein the stable solid product is friable.*

12. *The method of claim 11 wherein the amount of alkali metal silicate and setting agent forms less than about 10 percent by volume of the mixture.*

13. *The method of claim 12 wherein the cement, silicate, and liquid waste are mixed in ratio of about 1 part of cement to about 0.5 part of silicate to about 10 or more parts of liquid waste.*

14. *The method of claim 13 wherein ultimate disposal comprises use of the treated liquid and semi-liquid waste as a friable product in a landfill after mixing with the aqueous solution of alkali metal silicate and the silicate setting agent.*

15. *A method of treating liquid and semi-liquid organic wastes to render them non-polluting and fit for ultimate disposal, comprising mixing an aqueous solution of an alkali metal silicate with liquid or semi-liquid waste and a silicate setting agent from the group consisting of Portland cement, lime, gypsum and calcium chloride to cause the silicate and setting agent to react with each other, the proportions of alkali metal silicate and setting agent being such that the reaction converts the mixture into a consolidated chemically and physically stable solid product substantially insoluble in water and with its pollutants entrapped in a solidified silicate.*

16. *The method of claim 15 wherein the amount of alkali metal silicate and setting agent forms less than about 10 percent by volume of the mixture.*

17. *The method of claim 16 wherein the cement, silicate, and liquid waste are mixed in a ratio of about 1 part of cement to about 0.5 part of silicate to about 10 or more parts of liquid waste by volume.*

18. *The method of claim 15 wherein the stable solid product is clay-like.*

19. *The method of claim 15 further comprising the step of dispersing the treated liquid and semi-liquid waste in a landfill after mixing with the aqueous solution of alkali metal silicate and the silicate setting agent.*

20. *A method of treating liquid and semi-liquid wastes to render them non-polluting and fit for ultimate disposal, comprising mixing an aqueous solution of an alkali metal silicate with liquid or semi-liquid waste and a silicate setting agent from the group consisting of Portland cement, lime, gypsum, and calcium chloride to cause the silicate and setting agent to react with each other, the proportions of alkali metal silicate and setting agent being such that the reaction converts the mixture into a consolidated chemically and physically stable solid product substantially insoluble in water and with its pollutants entrapped in the solidified silicate, the cement, silicate, and liquid waste being mixed in a ratio of about 1 part of cement to about 0.5 part of silicate to about 10 or more parts of liquid waste by volume.*

21. *The method of claim 20 wherein the stable solid product is clay-like.*

22. The method of claim 21 wherein the waste contains polyvalent metal ions.

23. The method of claim 21 wherein the wastes are organic wastes.

24. The method of claim 21 further comprising the step of dispersing the treated liquid and semi-liquid waste in a landfill after mixing with the aqueous solution of alkali metal silicate and the silicate setting agent.

25. A method of treating liquid and semi-liquid wastes to render them non-polluting and fit for ultimate disposal, comprising mixing an aqueous solution of an alkali metal silicate with liquid or semi-liquid waste and a silicate setting agent from the group consisting of Portland cement, lime, gypsum, and calcium chloride to cause the silicate and setting agent to react with each other, the proportions of alkali metal silicate and setting agent being such that the reaction converts the mixture into a consolidated chemically and physically stable solid product substantially insoluble in water and with its pollutants entrapped in a solidified silicate, wherein ultimate disposal comprises dispersing the treated liquid and semi-liquid wastes in a landfill as a clay-like product after mixing with the aqueous solution of alkali metal silicate and the silicate setting agent.

26. The method of claim 25 wherein the amount of alkali metal silicate and setting agent forms less than about 10 percent by volume of the mixture.

27. The method of claim 26 wherein the cement, silicate, and liquid wastes are mixed in a ratio of about 1 part of cement to about 0.5 parts of silicate to about 10 or more parts of liquid waste by volume.

28. The method of claim 25 wherein the stable solid product is friable.

29. The method of claim 28 wherein the wastes contain polyvalent metal ions.

30. The method of claim 29 wherein the wastes are organic.

31. The method of claim 15 wherein the organic waste is raw sewage.

32. The method of claim 15 wherein the organic waste is raw human waste.

33. The method of claim 15 wherein the organic waste is household refuse.

34. The method of claim 15 wherein the waste is oil containing waste.

35. The method of claim 15 wherein the waste is municipal sewage sludge.

36. The method of claim 15 wherein the organic waste is biodegradable waste.

37. The method of claim 10 wherein the waste is spent steel pickling liquor.

38. The method of claim 10 wherein the waste is mine water sludge.

39. The method of claim 5 wherein ultimate disposal comprises using the product for land reclamation.

40. The method of claim 39 wherein ultimate disposal comprises using the product for reclamation of strip mine land.

41. The method of claim 5 wherein ultimate disposal comprises using the product as a fertilizer to enhance the production of land of little value.

42. The method of claim 5 wherein ultimate disposal comprises using the product for contouring of land.

43. The method of claim 5 wherein ultimate disposal comprises using the product for a road bed.

* * * * *